(12) United States Patent
Qiao et al.

(10) Patent No.: US 11,270,460 B2
(45) Date of Patent: Mar. 8, 2022

(54) METHOD AND APPARATUS FOR DETERMINING POSE OF IMAGE CAPTURING DEVICE, AND STORAGE MEDIUM

(71) Applicant: Tencent Technology (Shenzhen) Company Limited, Shenzhen (CN)

(72) Inventors: Liang Qiao, Shenzhen (CN); Xiangkai Lin, Shenzhen (CN); Linchao Bao, Shenzhen (CN); Yonggen Ling, Shenzhen (CN); Fengming Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 57 days.

(21) Appl. No.: 16/940,148

(22) Filed: Jul. 27, 2020

(65) Prior Publication Data
US 2020/0357136 A1 Nov. 12, 2020

Related U.S. Application Data

(63) Continuation of application No. PCT/CN2019/079347, filed on Mar. 22, 2019.

(30) Foreign Application Priority Data

Apr. 27, 2018 (CN) .......................... 201810393076.3

(51) Int. Cl.
*G06T 7/73* (2017.01)
*G06T 7/55* (2017.01)
*G06T 7/246* (2017.01)

(52) U.S. Cl.
CPC ................ *G06T 7/74* (2017.01); *G06T 7/248* (2017.01); *G06T 7/55* (2017.01); *G06T 2207/30244* (2013.01)

(58) Field of Classification Search
CPC .......... G06T 7/246; G06T 7/248; G06T 7/55; G06T 7/70; G06T 7/73; G06T 7/74; G06T 7/97; G06T 2207/30244
See application file for complete search history.

(56) References Cited

U.S. PATENT DOCUMENTS

| 2014/0126769 A1 | 5/2014 | Reitmayr et al. |
| 2014/0327792 A1 | 11/2014 | Mulloni et al. |

(Continued)

FOREIGN PATENT DOCUMENTS

| CN | 103826032 A | 5/2014 |
| CN | 107610175 A | 1/2018 |

OTHER PUBLICATIONS

Machine translation of CN 107610175 A. (Year: 2018).*

(Continued)

*Primary Examiner* — Andrew W Johns
(74) *Attorney, Agent, or Firm* — Morgan, Lewis & Bockius LLP

(57) ABSTRACT

A method for determining a pose of an image capturing device is performed at an electronic device. The electronic device acquires a plurality of image frames captured by the image capturing device, extracts a plurality of matching feature points from the plurality of image frames and determines first position information of each of the matching feature points in each of the plurality of image frames. After estimating second position information of each of the matching feature points in a current image frame in the plurality of image frames by using the first position information of each of the matching feature points extracted from a previous image frame in the plurality of image frames, the electronic device determines a pose of the image capturing (Continued)

device based on the first position information and the second position information of each of the matching feature points in the current image frame.

20 Claims, 12 Drawing Sheets

(56) References Cited

U.S. PATENT DOCUMENTS

| | | | |
|---|---|---|---|
| 2016/0364867 A1 | 12/2016 | Moteki et al. | |
| 2018/0165831 A1* | 6/2018 | Kwant et al. | G06T 7/74 |
| 2019/0145775 A1* | 5/2019 | Cui et al. | G06F 16/29 |
| | | | 701/446 |
| 2020/0167953 A1* | 5/2020 | Liu et al. | G05D 1/0094 |
| 2020/0334857 A1* | 10/2020 | Garud et al. | G01C 21/30 |

OTHER PUBLICATIONS

Extended European Search Report, EP19793739.4, dated Jan. 15, 2021, 9 pgs.
Alessandro Mulloni et al., "User Friendly SLAM Initialization", 2013 IEEE International Symposium on Mixed and Augmented Reality 2013 Science and Technology Proceedings, Oct. 1, 2013, Adelaide, SA, Australia, 10 pgs.
Tencent Technology, ISR, PCT/CN2019/079347, Jun. 28, 2019, 2 pgs.
Tencent Technology, WO, PCT/CN2019/079347, Jun. 28, 2019, 4 pgs.
Tencent Technology, IPRP, PCT/CN2019/079347, Oct. 27, 2020, 5 pgs.

* cited by examiner

Calculate a difference between two-dimensional position information of the first position information of each of the matching feature points in the current image frame and the two-dimensional position information of the second position information of each of the matching feature points in the current image frame — S410

Estimate the motion parameter matrix and the three-dimensional position information of the first position information of each of the matching feature points in the current image frame by minimizing the difference — S420

Update a pose of the image capturing device during capturing of the current image frame based on a rotation matrix and a displacement vector in the estimated motion parameter matrix — S430

FIG. 8

Solve the motion parameter matrix and the three-dimensional position information of the first position information of the matching feature point in the current image frame in a case that a quadratic sum of a difference between the two-dimensional position information of the first position information of each of the matching feature points in the current image frame and a projection is minimized — S421

FIG. 9

METHOD AND APPARATUS FOR DETERMINING POSE OF IMAGE CAPTURING DEVICE, AND STORAGE MEDIUM

CROSS REFERENCE TO RELATED APPLICATIONS

This application is a continuation application of PCT Patent Application No. PCT/CN2019/079347, entitled "METHOD AND APPARATUS FOR DETERMINING POSE OF IMAGE CAPTURE DEVICE, AND STORAGE MEDIUM THEREFOR" filed on Mar. 22, 2019, which claims priority to Chinese Patent Application No. CN201810393076.3, entitled "METHOD AND APPARATUS FOR DETERMINING POSE OF IMAGE CAPTURING DEVICE, AND STORAGE MEDIUM" filed Apr. 27, 2018, all of which are incorporated by reference in their entirety.

FIELD OF THE TECHNOLOGY

The present disclosure relates to a positioning method, and in particular, to a method and an apparatus for determining a pose of an image capturing device, a storage medium, and an electronic device that are applied to a monocular visual simultaneous localization and mapping (SLAM) system.

BACKGROUND OF THE DISCLOSURE

Augmented reality (AR) is a system in which virtual objects are superimposed in a real scene for display and interaction. At present, SLAM is the core technology of the AR system, which enables the AR system to obtain three-dimensional structure information of a scene and a position and a posture of the system in the scene in an unknown scene. A monocular visual SLAM system is a system in which only one camera is used to provide visual image information to complete an SLAM function. A mobile device such as a mobile phone is a hardware example of the monocular visual SLAM system.

After the monocular visual SLAM system is started, an initialization process is performed to reconstruct a structure of a local scene, determine a scene scale, and determine an initial position and orientation of the system. In the initialization process, after the SLAM system is started, an initial three-dimensional structure of the scene is reconstructed and an initial position and posture of the camera are estimated based on initial vision and sensor information.

The SLAM system usually uses a three-dimensional reconstruction structure from motion (SfM) technology, which requires that there are at least two images with large parallax changes for the same scene in order to use Epipolar geometry to reconstruct the scene structure and restore camera motion. Therefore, a user needs to move the device according to a specified requirement, which is highly dependent on the user's operation. Untrained users may spend a long time in moving the device and fail to provide two image frames that meet the requirement, and consequently the SLAM system cannot be started.

SUMMARY

The present disclosure is to eliminate defects that an existing monocular visual SLAM system imposes a higher requirement on motion of an image capturing device during initialization and cannot quickly and effectively determine a pose of the image capturing device to complete the initialization, and therefore there is no need to force a user to move the device in a specified manner.

According to one aspect of the present disclosure, a method for determining a pose of an image capturing device is performed at an electronic device having a processor and memory storing a plurality of programs to be executed by the processor, the method including:
  acquiring a plurality of image frames captured by the image capturing device;
  extracting a plurality of matching feature points from the plurality of image frames and determining first position information of each of the matching feature points in each of the plurality of image frames;
  estimating second position information of each of the matching feature points in a current image frame in the plurality of image frames by using the first position information of each of the matching feature points extracted from a previous image frame in the plurality of image frames; and
  determining a pose of the image capturing device based on the first position information and the second position information of each of the matching feature points in the current image frame.

According to still another aspect of the present disclosure, a non-transitory computer readable storage medium is provided, storing storing at least one instruction, the instruction being loaded and executed by a processor of an electronic device and causing the electronic device to perform the foregoing method.

According to yet another aspect of the present disclosure, an electronic device is provided, including: a processor; and a memory configured to store a plurality of executable instructions that, when executed by the processor, cause the electronic device to perform the foregoing method.

In the embodiments of this application, position information of a feature point in a current image frame is estimated according to position information of the feature point in a previous image frame, and a pose of an image capturing device in the current image frame according to position information of a plurality of feature points in the current image frame and the estimated position information. According to the embodiments of this application, the pose of the image capturing device can be quickly and efficiently determined without forcing a user to move the device in a specified manner.

BRIEF DESCRIPTION OF THE DRAWINGS

The above-mentioned and other features and advantages of the present disclosure will become more apparent from the detailed description of exemplary embodiments of the present disclosure made with reference to the accompanying drawings.

FIG. 8 shows a specific procedure of determining a pose of an image capturing device based on first position information and second position information of each matching feature point according to an embodiment of the present disclosure.

FIG. 9 shows a specific procedure of estimating a motion parameter matrix and first position information of each matching feature point by minimizing a difference according to an embodiment of the present disclosure.

DESCRIPTION OF EMBODIMENTS

Figure 1:
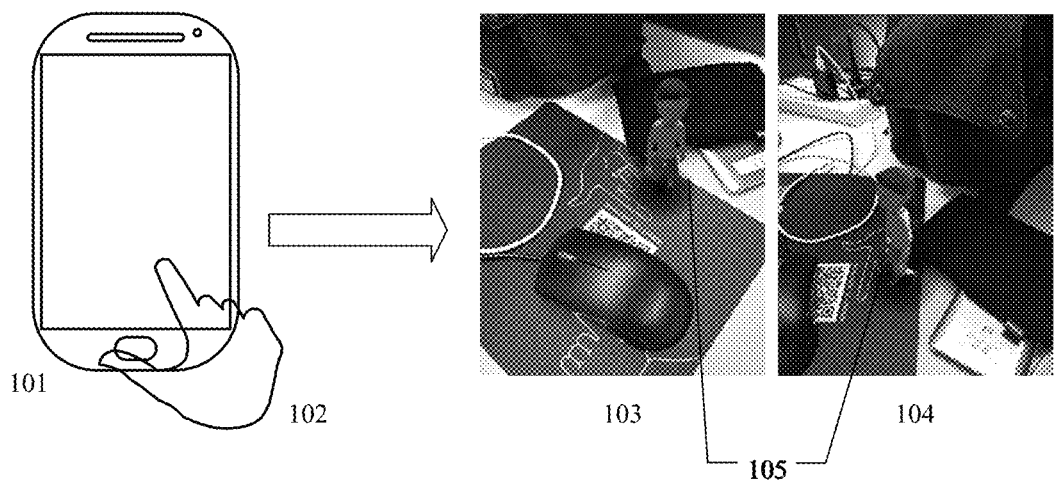
FIG. 1 is a schematic diagram of an application scenario in which a mobile device is used as a monocular visual SLAM system according to an embodiment of the present disclosure.

Exemplary embodiments will be described more comprehensively with reference to the accompanying drawings. However, the exemplary embodiments can be implemented in various forms, and are not to be construed as being limited to the implementations described herein. Instead, the implementations are provided to make the present disclosure more comprehensive and complete, and fully convey the ideas of the exemplary embodiments to a person skilled in the art. In the figures, for clarity, dimensions of some elements may be exaggerated or altered. Same reference numerals in the figures represent same or similar structures, and therefore detailed descriptions of the structures will be omitted.

In addition, the described features, structures or characteristics may be combined in one or more embodiments in any appropriate manner. In the following descriptions, many specific details are provided to obtain a thorough understanding of the embodiments of the present disclosure. However, a person skilled in the art is to be aware that the technical solutions in the present disclosure may be implemented without one or more of the particular details, or other methods or elements may be used. In other cases, well-known structures, methods, or operations are not shown or described in detail, so as not to obscure the aspects of the present disclosure.

FIG. 1 is a schematic diagram of an application scenario in which a mobile device such as a mobile phone is used as a monocular visual SLAM system according to an embodiment of the present disclosure. The mobile device is, for example but not limited to, a mobile phone, a personal digital assistant, or a tablet computer. In an AR game using a smartphone, a user manipulates a screen of a smartphone 101 through a hand 102 to play the AR game. On the screen of the smartphone, a virtual object 105 is fixed somewhere or dancing on a table in real 3D scenes 103 and 104 without moving with movement of the user's smartphone. The 3D scenes 103 and 104 are two image frames with large parallax acquired through an image capturing device (for example, a front-facing or rear-facing camera) of the smartphone 101 when the smartphone 101 moves. Therefore, the method and the apparatus in the embodiments of the present disclosure are mainly applied to a terminal equipped with an image capturing device.

Figure 2:
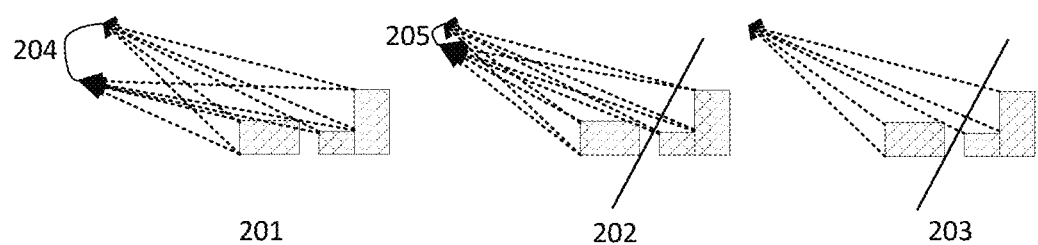
FIG. 2 is a comparison diagram of image capturing respectively using a fundamental matrix, a homography matrix, and the solution in the embodiments of the present disclosure to initialize a monocular visual SLAM system.

FIG. 2 is a comparison diagram of image capturing respectively using a fundamental matrix, a homography matrix, and the solution in the embodiments of the present disclosure to initialize a monocular visual SLAM system.

In a scene 201, the fundamental matrix (F matrix) is used to initialize the monocular visual SLAM system. Initialization of all existing monocular visual SLAM systems (such as PTAM and ORB-SLAM) is based on the principle of Epipolar geometry. If three-dimensional points of the same scene are imaged on two different image frames, the three-dimensional points, imaged points on the two image frames, and a center of an image capturing device during shooting of the two image frames are on the same spatial plane. The fundamental matrix is a mathematical expression that describes an Epipolar geometry relationship. Motion information of the image capturing device between the two image frames may be estimated by using image coordinates of at least 8 pairs of corresponding feature points, and coordinates of three-dimensional scene points of other corresponding feature points may be solved through a triangulation algorithm. In this way, system initialization is implemented.

Initializing the system through the fundamental matrix requires big movement between the input two image frames (as represented by the arc 204 between the ends of two groups of arrow lines in the scene 201), and images only with rotational motion often cause an initialization failure. In an existing solution, a user is required to tap the screen at a specified moment to trigger the SLAM system initialization process, and the user is required to move the device so that a current image frame has sufficient parallax relative to an image at the tapping moment. When the user has enough movement, the SLAM system obtains the required two frames of initialized images, and completes the initialization through an SfM technology. However, this solution depends heavily on the user's operation, and untrained users may not be able to move as required, and consequently the SLAM system cannot be started.

When a relative depth difference of an object in the scene is much less than a distance from the scene to the image capturing device, the scene may be considered as a plane. The homography matrix describes a transformation relationship of the plane scene in the two image frames, and motion of the image capturing device during shooting of the two image frames may be obtained by decomposing the homography matrix. In a scene 202 in FIG. 2, the homography matrix is used to initialize the monocular visual SLAM system. In addition, when a motion amplitude of the image capturing device is small, parallax of the two frames of image is very small (see, e.g., the arc 205 between the ends of two groups of arrow lines in the scene 202), and simple use of homography matrix transformation cannot effectively distinguish depth information of the scene. In this case, motion of the image capturing device may be described by the homography matrix transformation. However, this solution also requires the user to perform large-magnitude motion to obtain images with different parallax through homography transformation.

In view of the above, the embodiments of the present disclosure proposes to assume that the scene meets a requirement of the homography matrix between the first two image frames obtained by the image capturing device, and a depth of the scene and a pose of a camera are obtained by decomposing the homography matrix, which corresponds to a case shown in scene 203 in FIG. 2. In each subsequent frame, depth information of a feature point in an initial scene is updated through a local bundle adjustment (BA) optimization problem, and a pose of the image capturing device is updated at a moment when the image frame is acquired. In this solution, a complete SLAM function can be provided when the first image frame is being acquired after the system is started, a scene structure is automatically optimized based on the user's movement, and a plurality of images that can be used by the SfM algorithm may be output without forcing the user to move the device in a specified manner.

Figure 3:
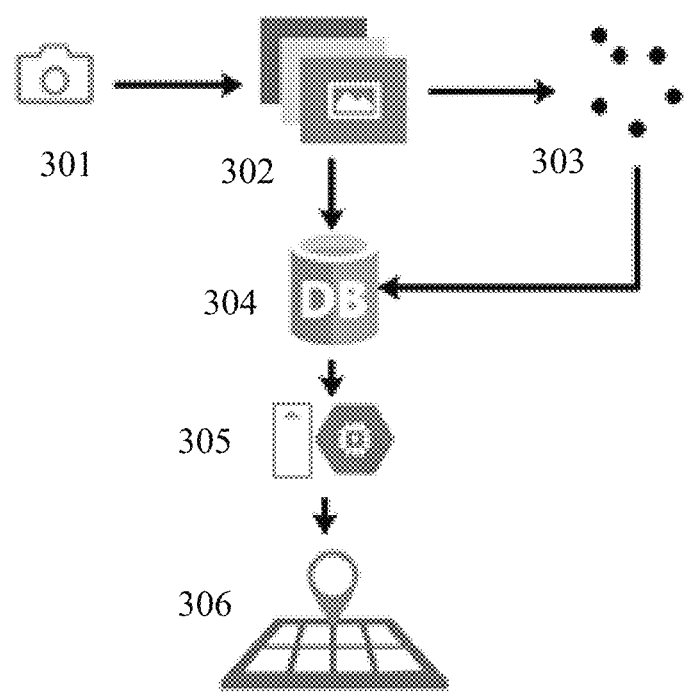
FIG. 3 is a schematic diagram of initializing a monocular visual SLAM system according to an embodiment of the present disclosure.

FIG. 3 is a schematic diagram of an initialization process of a SLAM system according to an embodiment of the present disclosure.

After an image capturing device 301 acquires a plurality of images 302, an image processing module performs distortion removal and blur processing on the images 302. A plurality of matching feature points 303 are obtained from the images 302 through feature extraction and matching. The "matching feature points" mentioned herein are image feature points of the same physical point in two or more images in practice. A database (DB) 304 of the system stores the image information and the matching feature point information, and provides the information for a server 305. The server 305 has a homography matrix transformation function and a local BA optimization function. By running the above functions, the server 305 obtains three-dimensional map information of a scene and pose information 306 of the image capturing device 301. It is to be understood that the server 305 of the SLAM system (for example, the homography matrix transformation function and the local BA optimization function) may be integrated in the image capturing device of the SLAM system (for example, a terminal device such as a mobile phone), or may be located remotely from the image capturing device and communicate with the image capturing device via a communication link.

A method and an apparatus for determining a pose of an image capturing device during initialization of a SLAM system are described in detail below in the embodiments of the present disclosure.

Figure 4:
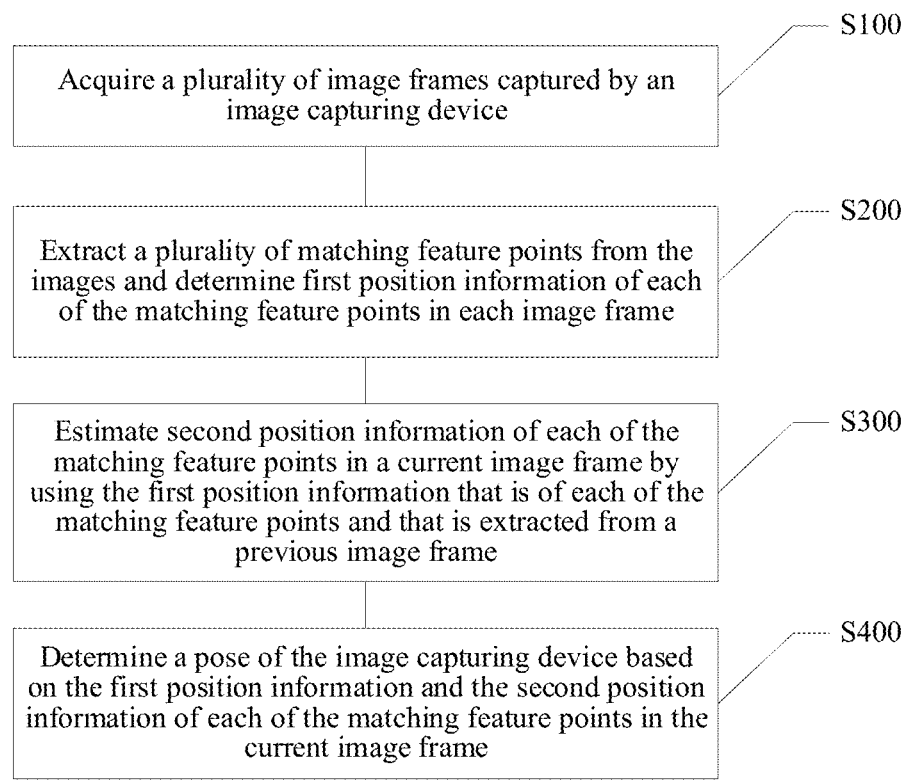
FIG. 4 is a flowchart of a method of determining a pose of an image capturing device according to an embodiment of the present disclosure.

FIG. 4 shows a method for determining a pose of an image capturing device according to an embodiment of the present disclosure. The method may be performed by a calculating device having calculating and processing capabilities, such as a terminal device or a server of a SLAM system as described above. The method includes the following steps:

S100: Acquire a plurality of image frames captured by an image capturing device.

S200: Extract a plurality of matching feature points from the image frames and determine first position information of each of the matching feature points in each image frame.

S300: Estimate second position information of each of the matching feature points in a current image frame by using the first position information that is of each of the matching feature points and that is extracted from a previous image frame.

S400: Determine a pose of the image capturing device based on the first position information and the second position information of each of the matching feature points in the current image frame.

First, the SLAM system uses the image capturing device to capture the plurality of image frames.

Then, feature extraction and matching are performed at the arrival of each image frame. Feature extraction can use different algorithms, such as Harris Corner, FAST, SIFT, SURF, and ORB. Usually, after a feature point is extracted, a descriptor of the feature point is generated to distinguish different feature points. A plurality of feature points are extracted from a plurality of image frames captured in a 3D real scene, an image coordinate of an $i^{th}$ feature point is $\{u_i, v_i\}$, and a homogeneous coordinate of the corresponding three-dimensional scene is $\{x_i, y_i, 1, w_i\}$. In order to simplify the calculation, an inverse depth w is used instead of the z coordinate (w=1/z), which is a reciprocal of a scene depth.

Feature matching is performed between two adjacent image frames. A feature matching algorithm may be used to perform matching through optical flow tracking or based on a similarity of descriptors of feature points. After feature extraction and feature matching, image information is converted into the first position information of the matching feature point.

Figure 5:
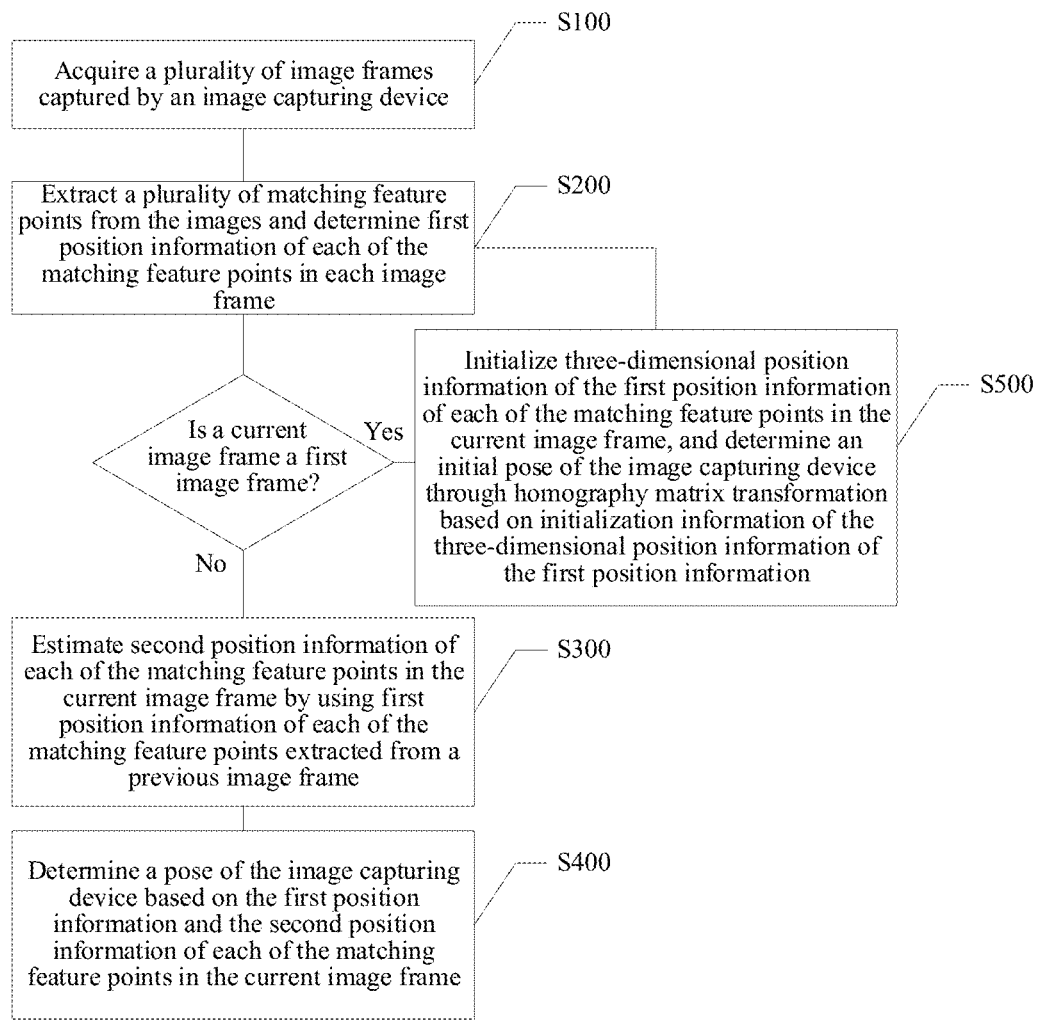
FIG. 5 is a flowchart of a method of determining a pose of an image capturing device according to another embodiment of the present disclosure.

As shown in FIG. 5, the method for determining a pose of an image capturing device according to an embodiment of the present disclosure further includes: performing an initialization step when the current image frame is the first image frame:

S500: Initialize three-dimensional position information of the first position information of each of the matching feature points in the current image frame, and determine an initial pose of the image capturing device through homography matrix transformation based on initialization information of the three-dimensional position information of the first position information.

In this case, the system initializes, as $p_i=\{x_i, y_i, 1, w_i\}$, a descriptor expressed in the inverse depth form of the spatial three-dimensional point corresponding to the extracted $i^{th}$ matching feature point, and the initial pose of the image capturing device is $$T_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix} = \begin{bmatrix} I & 0 \\ 0 & 1 \end{bmatrix},$$

I being a unit matrix.

After initialization, step S200 is performed again in this procedure. If the current image frame is not the first image frame, step S300 is directly performed after step S200.

Figure 6:
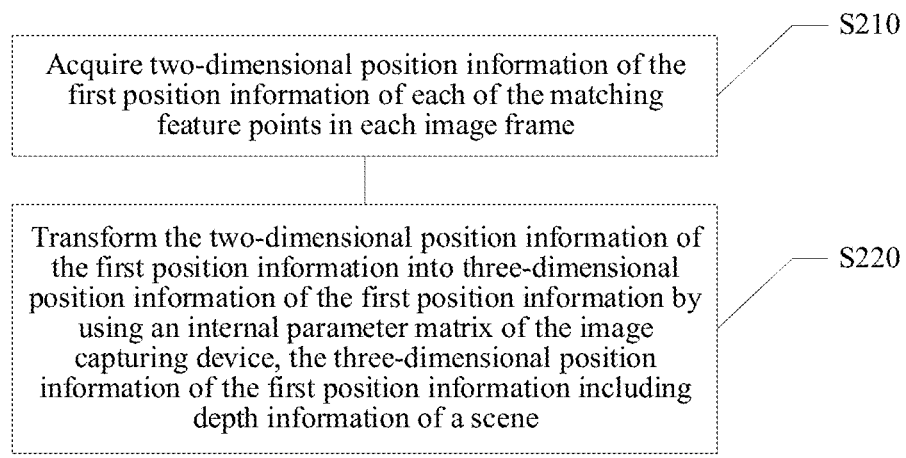
FIG. 6 shows a specific procedure of extracting a plurality of matching feature points in an image and first position information thereof according to an embodiment of the present disclosure.

According to an embodiment of the present disclosure shown in FIG. 6, step S200 further includes the following steps:

S210: Acquire two-dimensional position information of the first position information of each of the matching feature points in each image frame.

S220: Transform the two-dimensional position information of the first position information into three-dimensional position information of the first position information by using an internal parameter matrix of the image capturing device, the three-dimensional position information of the first position information including depth information of a scene.

If a pinhole camera imaging model is used, the internal parameter matrix of the image capturing device is $$K = \begin{bmatrix} f_x & 0 & c_x \\ 0 & f_y & c_y \\ 0 & 0 & 1 \end{bmatrix},$$

$f_x$ and $f_y$ being focal lengths of the image capturing device on an x-axis and a y-axis, and $c_x$ and $c_y$ being intersection coordinates (optical centers) of a main optical axis of the image capturing device on an imaging plane.

It is assumed that a coordinate of a matching feature point on the image is $p_i=\{u_i, v_i\}$, where u and v are u-axis and v-axis coordinates of the $i^{th}$ matching feature point on this image frame.

In step S220, a coordinate of a three-dimensional point corresponding to a matching feature point $p_i$ in the scene, that is, three-dimensional position information, is expressed as $p_i=\{x_i, y_i, 1, w_i\}$ by using the inverse depth. In this case, the following formula is met:

$$\begin{Bmatrix} u_i \\ v_i \\ 1 \end{Bmatrix} = K \begin{Bmatrix} \frac{x_i}{w_i} \\ \frac{y_i}{w_i} \\ \frac{1}{w_i} \end{Bmatrix} \quad (1)$$

In this way, in one image frame, the matching feature point may be described with only one parameter, namely, the inverse depth $w_i$.

Figure 7:
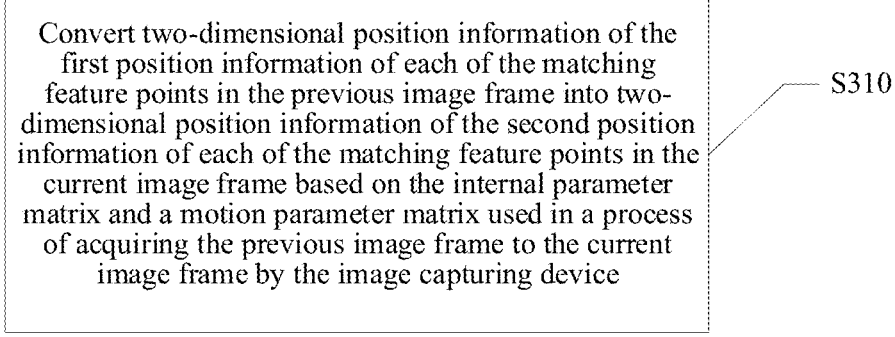
FIG. 7 shows a specific procedure of estimating second position information in a current image frame using first position information of a matching feature point extracted from a previous image frame according to an embodiment of the present disclosure.

FIG. 7 specifically shows the step of estimating second position information in a current image frame by using first position information that is of a matching feature point and that is extracted from a previous image frame. The following step is included:

S310: Convert two-dimensional position information of the first position information of each of the matching feature points in the previous image frame into two-dimensional position information of the second position information of each of the matching feature points in the current image frame based on the internal parameter matrix and a motion parameter matrix used in a process of acquiring the previous image frame to the current image frame by the image capturing device.

The motion parameter matrix includes a rotation matrix and a displacement vector of the image capturing device, the rotation matrix representing posture information in the pose of the image capturing device, and the displacement vector representing position information in the pose of the image capturing device.

Usually, the first several image frames after the system is started are basically the same. In this case, a homography matrix H is used for estimation and decomposition to solve the pose of the image capturing device.

The homography matrix H describes a transformation relationship of the plane scene under different viewing angles of the image capturing device, and matching feature points on an $m^{th}$ image frame and an $n^{th}$ image frame that are adjacent to each other are $p_i^m$, $p_i^n$. In this case, the following formula is met:

$$p_i^n = H * p_i^m \quad (2)$$

According to a pinhole camera imaging relationship, the following formula is met:

$$p_i^n = K \begin{bmatrix} R & t \\ 0 & 1 \end{bmatrix} * K^{-1} p_i^m \quad (3)$$

R is an 3×3 rotation matrix of the image capturing device, corresponding to three rotational freedom degrees of three optical axes of the image capturing device, and t is a 3×1 displacement vector, corresponding to three coordinates of the image capturing device in three-dimensional space.

Formulas (2) and (3) are compared, and the following formula may be learned:

$$H = K \begin{bmatrix} R & t \\ 0 & 1 \end{bmatrix} K^{-1} \quad (4)$$

Therefore, the homography matrix H between the two image frames may be first calculated according to pixel coordinates of at least 4 pairs of matching feature points, and then matrix decomposition is performed to obtain the motion parameter matrix $T_{mn}=H$ of the image capturing device in the two image frames.

FIG. 8 specifically shows the step of determining a pose of the image capturing device based on the first position information and the second position information of the matching feature point in the current image frame according to an embodiment of the present disclosure. The following step is included:

S410: Calculate a difference between two-dimensional position information of the first position information of each of the matching feature points in the current image frame and the two-dimensional position information of the second position information of each of the matching feature points in the current image frame.

S420: Estimate the motion parameter matrix and the three-dimensional position information of the first position information of each of the matching feature points in the current image frame by minimizing the difference.

S430: Update a pose of the image capturing device during capturing of the current image frame based on a rotation matrix and a displacement vector in the estimated motion parameter matrix.

By constructing and solving the following optimization problem, the system obtains a parameter of the inverse depth descriptor of the matching feature point and the updated value of the motion parameter matrix of the image capturing device through the solving.

It is assumed that the previous image frame (an $m^{th}$ frame) and the current image frame (an $n^{th}$ frame) are $I^m$ and $I^n$, two-dimensional position information of an $i^{th}$ matching feature point in the two image frames are $p_i^m=\{u_i^m, v_i^m\}$ and $p_i^n=\{u_i^n, v_i^n\}$, three-dimensional coordinate information of a three-dimensional point in a scene corresponding to the matching feature point is $p_i^m = K^{-1} p_i^m$ and $p_i^n = K^{-1} p_i^m$, and the motion parameter matrix between the two image frames is $$T_{mn} = \begin{bmatrix} R_{mn} & t_{mn} \\ 0 & 1 \end{bmatrix}.$$

In this case, the following formula is met:

$$p_i^n = T_{mn} * p_i^m = \begin{bmatrix} R_{mn} & t_{mn} \\ 0 & 1 \end{bmatrix} p_i^m \quad (5)$$

$R_{mn}$ is a 3×3 rotation matrix, and $t_{mn}$ is a 3×1 displacement vector.

After conversion by using a two-dimensional coordinate system of an image, the following formula is met:

$$K^{-1} p_i^n = \begin{bmatrix} R_{mn} & t_{mn} \\ 0 & 1 \end{bmatrix} K^{-1} p_i^m \quad (6)$$

After transformation, the following formula is obtained:

$$p_i^n = K \begin{bmatrix} R_{mn} & t_{mn} \\ 0 & 1 \end{bmatrix} K^{-1} p_i^m \quad (7)$$

The above formula describes a projection relationship of the three-dimensional space point corresponding to the same matching feature point from $I^m$ to $I^n$ under the motion parameter matrix of the image capturing device. In fact, the projection relationship in formula (7) also indicates that from the $m^{th}$ image frame to the $n^{th}$ image frame, the two-dimensional position information of the first position information that is of the $i^{th}$ matching feature point and that is extracted from the $m^{th}$ image frame is used to estimate the two-dimensional position information of the second position information of the matching feature point in the $n^{th}$ image frame.

Herein, the first position information is coordinate information of the matching feature point extracted from the image, when expressed in two-dimensional space of the image plane, the first position information is in the form of $p_i^m = \{u_i^m, v_i^m\}$, and when expressed in three-dimensional space, the first position information is in the form of $p_i^m = \{x_i^m, y_i^m, 1, w_i^m\}$. The second position information is position information estimated by using the first position information of the matching feature point extracted from the previous image frame.

In actual application, due to effects of errors and lens distortion, a coordinate of the matching feature point extracted from the image $I^n$ are not consistent with a projected coordinate. An optimization goal of the above-mentioned estimated position information is to make the first position information $p_i^n$ extracted from the image $I^n$ and the second position information $p'_i^n$ estimated based on the first position information $p_i^m$ extracted from the image as consistent as possible, that is, a square $$\left| p_i^n - K \begin{bmatrix} R_{mn} & t_{mn} \\ 0 & 1 \end{bmatrix} K^{-1} p_i^m \right|^2$$

of a difference between the first position information and the second position information is as small as possible. For all matching feature points of two frames, the following problem is constructed:

$$R, t, w_i = \operatorname{argmin} \Sigma_i |M'_i - \operatorname{proj}(R, t, M_i, w_i)|^2 \quad (8)$$

$M'_i$ is a coordinate of the $i^{th}$ matching feature point in the current image frame obtained through feature extraction, $M_i$ is a coordinate of the $i^{th}$ matching feature point in the previous image frame obtained through feature extraction, and $$\operatorname{proj}(R, t, M_i, w_i) = K \begin{bmatrix} R & t \\ 0 & 1 \end{bmatrix} K^{-1} M_i$$

is a projection function.

Therefore, in the method according to the embodiment of the present disclosure shown in FIG. 9, the two-dimensional position information of the second position information of each of the matching feature points in the current image frame is a projection of a two-dimensional position of the first position information that is of the matching feature point and that is extracted from the previous image frame on the current image frame. In this case, step S420 further includes the following step:

S421: Solve the motion parameter matrix and the three-dimensional position information of the first position information of the matching feature point in the current image frame in a case that a quadratic sum of a difference between the two-dimensional position information of the first position information of each of the matching feature points in the current image frame and a projection is minimized.

The above optimization process may be solved through Gauss-Newton iteration. When actual motion of the image capturing device is small, the inverse depth $w_i$ of the matching feature point degenerates to 0 in a Jacobian matrix of the iterative process, and therefore the iterative process is unstable and an accurate inverse depth optimized solution cannot be obtained. Therefore, at each iteration, a size of a motion parameter matrix of each matching feature point is tested. If the motion parameter matrix is too small, a Jacobian change value of the matching feature point is set to 0. The iteration process ends when an interpolation result of two adjacent iterations is less than a given threshold or a number of iterations reaches a given value.

Figure 10:
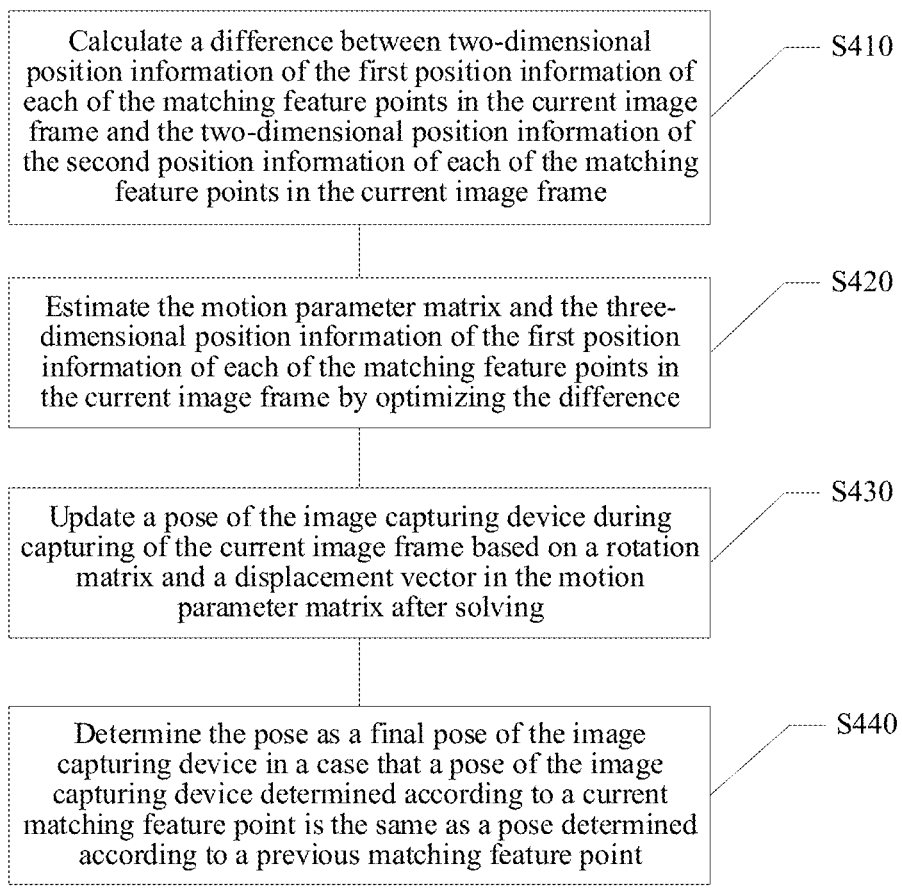
FIG. 10 shows a specific procedure of determining a pose of an image capturing device based on first position information and second position information of each matching feature point according to another embodiment of the present disclosure.

FIG. 10 shows a specific procedure of determining a pose of an image capturing device based on first position information and second position information of each matching feature point according to another embodiment of the present disclosure. Compared with the method shown in FIG. 7, the method further includes the following step:

S440: Determine the pose as a final pose of the image capturing device in a case that a pose of the image capturing device determined according to a current matching feature point is the same as a pose determined according to a previous matching feature point.

When a result of an optimization solution is such that there is no to-be-updated matching feature point, that is, when the rotation matrix R and the displacement vector t in the motion parameter matrix of the image capturing device obtained by solving the above optimization problem of the matching feature points twice and the inverse depth $w_i$ are the same, the initialization process is completed, the three-dimensional coordinate of the matching feature point in the initial scene is a solution result of the current image frame, a position and a posture of the image capturing device corresponding to the current image frame are the final pose, that is, the pose of the image capturing device in the initial scene. In addition, the first image frame and the current image frame may be used as input images of the SLAM initialization process, and the SLAM initialization process is completed by solving a fundamental matrix and reconstructing a three-dimensional scene by triangulation.

According to the method in this embodiment of the present disclosure, in the entire initialization process, no special movement of the user is required, and provided that some parts of the first image can always be viewed in the initialization process, continuous poses and three-dimensional scene structures and three-dimensional map information of the image capturing device can be output in this initialization method, so that rendering, interaction, and other functions can be performed when the monocular visual SLAM is applied to the first frame.

In this method, the user experience is good, fast and robust, a complete SLAM function can be provided when the first image frame is being acquired after the system starts, and a scene structure is continuously optimized automatically according to user's movement. In addition, a plurality of images that can be used by an SfM algorithm can be further output without forcing the user to move the device in a specific manner, so that the consistent, smooth, and reliable SLAM function can be provided for an AR system starting from the first image frame. Moreover, in the foregoing method, two appropriate image frames can be effectively selected, and the complete and continuous SLAM function continues to be provided for the user in this process, greatly increasing the user's success rate of using the monocular SLAM system, and increasing the user stickiness of an application.

Alternatively, a common xyz three-parameter representation method may be used instead of the inverse depth w representation scheme, or different optimization algorithms may be used to introduce other sensors such as a binocular camera and an inertial motion unit (IMU) sensors, and vision and sensor information are fused to replace the solving of the optimization problem.

An apparatus for determining a pose of an image capturing device applied to an initialization process of a monocular visual SLAM system according to an embodiment of the present disclosure is now described.

Figure 11:
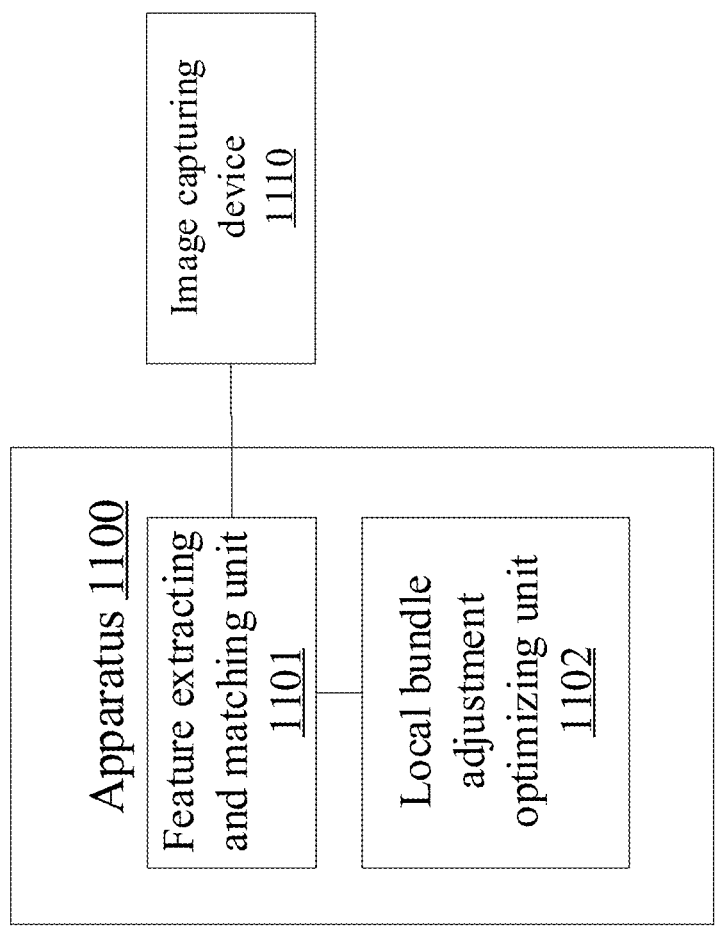
FIG. 11 is a structural block diagram of an apparatus for determining a pose of an image capturing device according to an embodiment of the present disclosure.

FIG. 11 is a structural block diagram of an apparatus for determining a pose of an image capturing device according to an embodiment of the present disclosure.

An apparatus 1100 for determining a pose of an image capturing device includes a feature extracting and matching unit 1101 and a local bundle adjustment optimizing unit 1102. The feature extracting and matching unit 1101 is configured to extract a plurality of matching feature points from a plurality of image frames acquired by the image capturing device 1110 and first position information of each of the matching feature points in each image frame. The local bundle adjustment optimizing unit 1102 is configured to estimate second position information of each of the matching feature points in a current image frame by using first position information that is of each of the matching feature points and that is extracted from a previous image frame, and determine a pose of the image capturing device based on the first position information and the second position information of each of the matching feature points in the current image frame.

According to an embodiment of the present disclosure, the feature extracting and matching unit 1101 is further configured to acquire two-dimensional position information of the first position information of each of the matching feature points in each image frame; and transform the two-dimensional position information of the first position information into three-dimensional position information of the first position information by using an internal parameter matrix of the image capturing device, the three-dimensional position information of the first position information including information of a scene.

According to an embodiment of the present disclosure, the local bundle adjustment optimizing unit 1102 is further configured to convert two-dimensional position information of the first position information of each of the matching feature points in the previous image frame into two-dimensional position information of the second position information of each of the matching feature points in the current image frame based on the parameter matrix and a motion parameter matrix used in a process of acquiring the previous image frame to the current image frame by the image capturing device, the motion parameter matrix including a rotation matrix and a displacement vector of the image capturing device, the rotation matrix representing posture information in the pose of the image capturing device, and the displacement vector representing position information in the pose of the image capturing device.

According to an embodiment of the present disclosure, the local bundle adjustment optimizing unit 1102 is further configured to calculate a difference between two-dimensional position information of the first position information of each of the matching feature points in the current image frame and the two-dimensional position information of the second position information of each of the matching feature points in the current image frame; estimate the motion parameter matrix and the three-dimensional position information of the first position information of each of the matching feature points in the current image frame by optimizing the difference; and update a pose of the image capturing device during capturing of the current image frame based on the rotation matrix and the displacement vector in the estimated motion parameter matrix.

According to an embodiment of the present disclosure, the two-dimensional position information of the second position information of each of the matching feature points in the current image frame is a projection of a two-dimensional position of the first position information that is of the matching feature point and that is extracted from the previous image frame on the current image frame, and the local bundle adjustment optimizing unit 1102 is further configured to solve the motion parameter matrix and the three-dimensional position information of the first position information of the matching feature point in the current image frame in a case that a quadratic sum of a difference between the two-dimensional position information of the first position information of each of the matching feature points in the current image frame and the projection is minimized.

According to an embodiment of the present disclosure, the local bundle adjustment optimizing unit 1102 is further configured to determine the pose as a final pose of the image capturing device in a case that a pose of the image capturing device determined according to a current matching feature point is the same as a pose determined according to a previous matching feature point.

Figure 12:
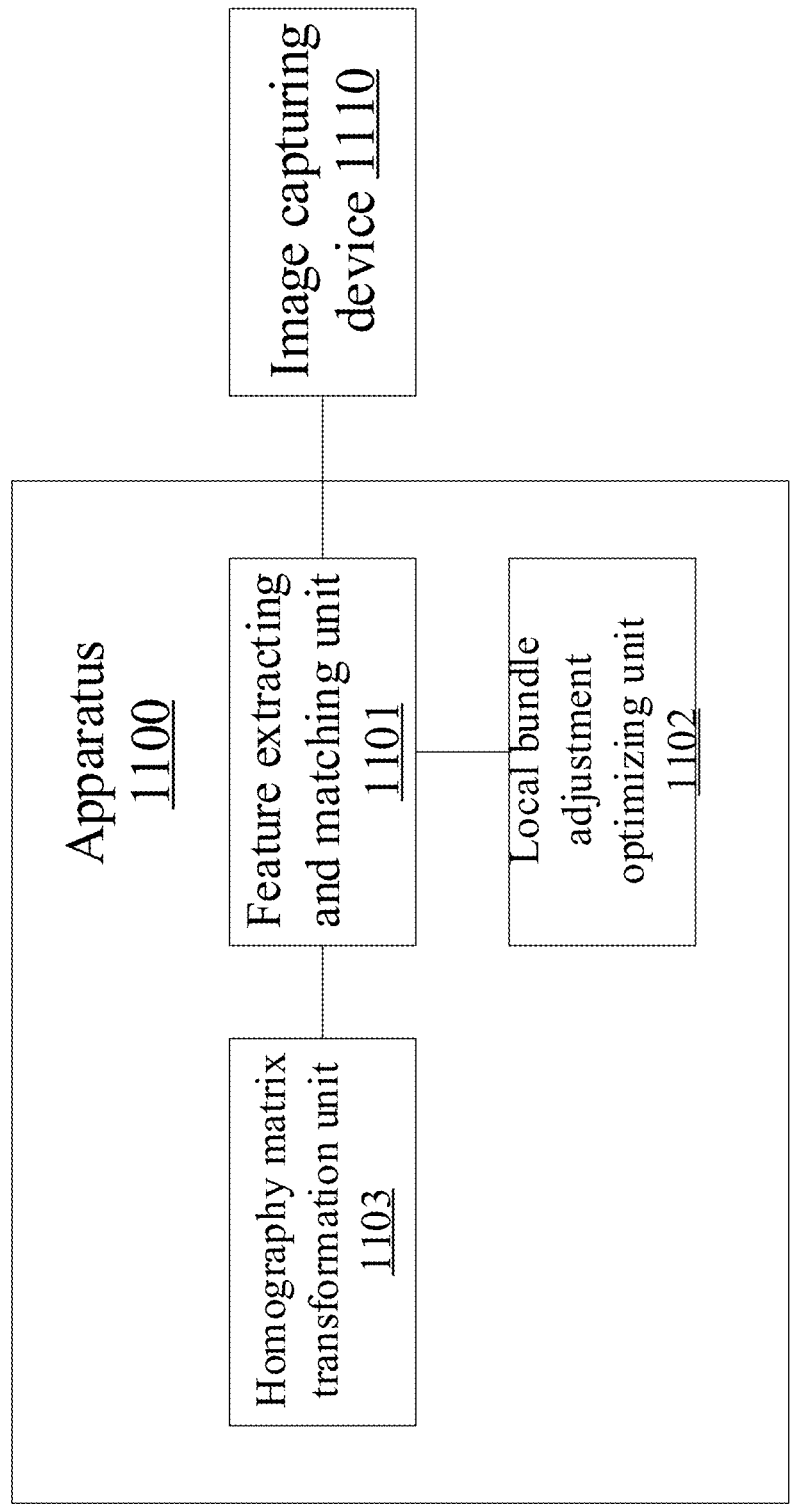
FIG. 12 is a structural block diagram of an apparatus for determining a pose of an image capturing device according to another embodiment of the present disclosure.

FIG. 12 is a structural block diagram of an apparatus for determining a pose of an image capturing device according to another embodiment of the present disclosure. Compared with FIG. 11, the apparatus further includes a homography matrix transformation unit 1103 configured to initialize three-dimensional position information of the first position information of each of the matching feature points in the current image frame in a case that the current image frame is the first image frame, and determine an initial pose of the image capturing device through homography matrix transformation based on initialization information of the three-dimensional position information of the first position information.

Figure 13:
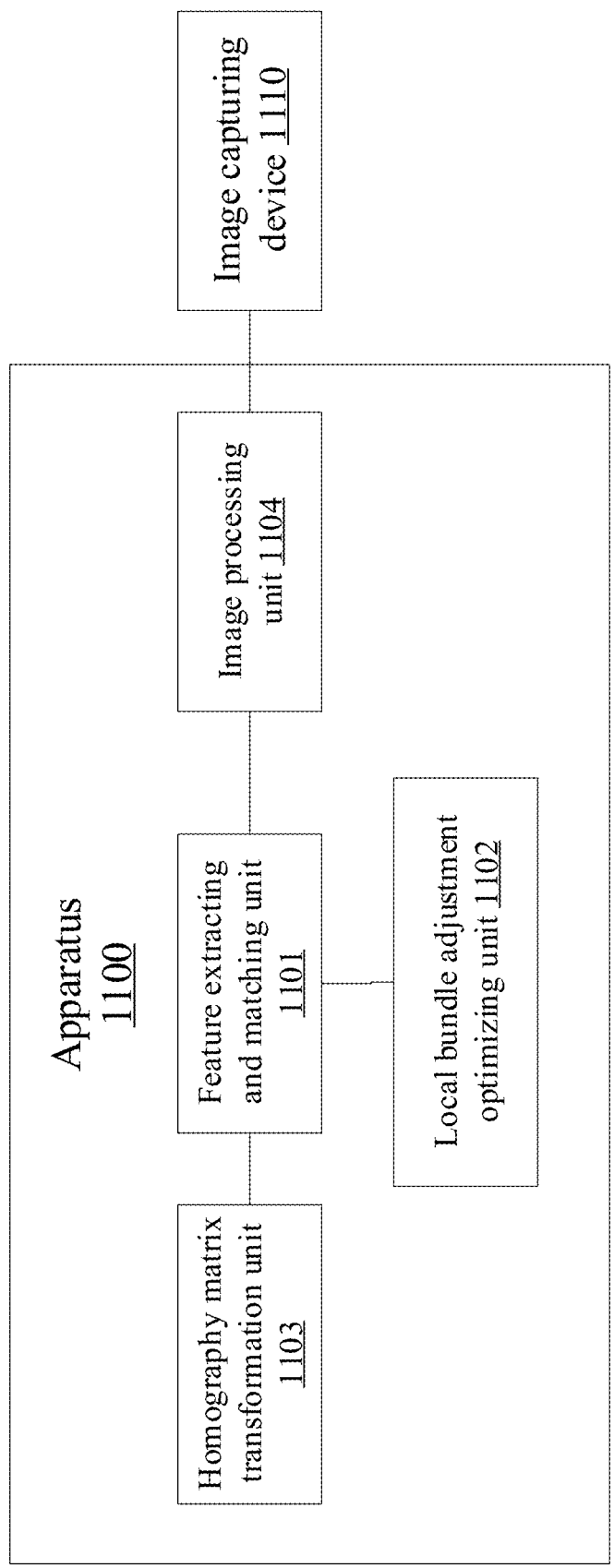
FIG. 13 is a structural block diagram of an apparatus for determining a pose of an image capturing device according to still another embodiment of the present disclosure.

FIG. 13 is a structural block diagram of an apparatus for determining a pose of an image capturing device according to still another embodiment of the present disclosure. The apparatus further includes an image processing unit 1104 configured to eliminate distortion and blur of an image.

Figure 14:
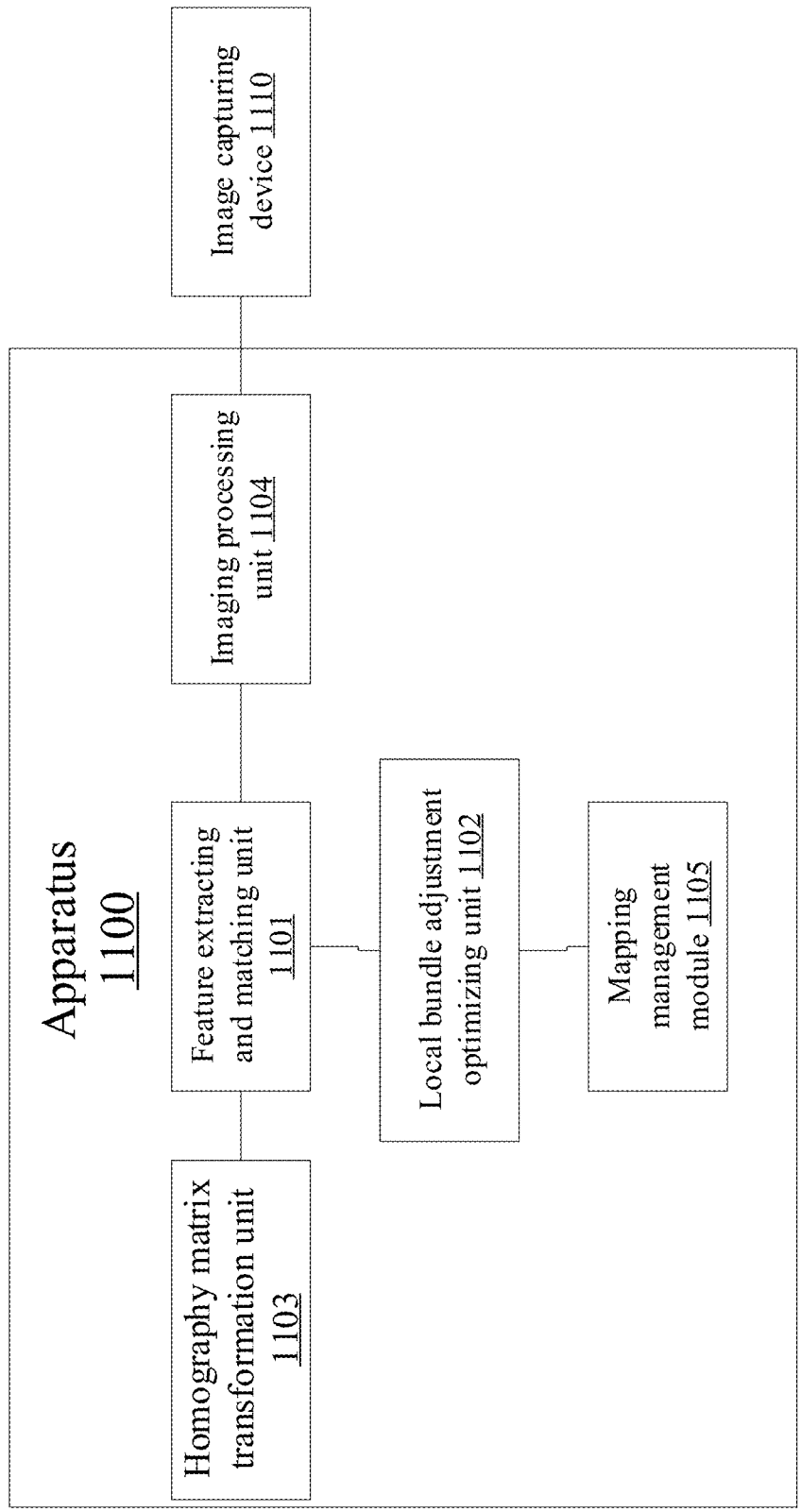
FIG. 14 is a structural block diagram of an apparatus for determining a pose of an image capturing device according to yet another embodiment of the present disclosure.

Compared with FIG. 13, an apparatus in FIG. 14 further includes a map management module 1105 configured to generate three-dimensional map information based on the image and the pose of the image capturing device.

According to an apparatus for determining a pose of an image capturing device in an initialization process of a monocular visual SLAM system, assuming that a scene meets a requirement of a homography matrix in the first two image frames, a depth of the scene and a pose of a camera are obtained by decomposing the homography matrix. In each subsequent image frame, depth information of a feature point in an initial scene is updated through a local bundle adjustment optimization problem, and the pose of the camera in this moment is updated. Therefore, the user experience is good, fast and robust, a complete SLAM function can be provided when the first image frame is being acquired after the system starts, and a scene structure is continuously optimized automatically according to user's movement. In addition, a plurality of images that can be used by an SfM algorithm can be further output without forcing the user to move the device in a specific manner, so that the consistent, smooth, and reliable SLAM function can be provided for an AR system starting from the first image frame. Moreover, in the foregoing method, two appropriate image frames can be effectively selected, and the complete and continuous SLAM function continues to be provided for the user in this process, greatly increasing the user's success rate of using the monocular SLAM system, and increasing the user stickiness of an application.

Although several modules or units of the apparatus for determining a pose of an image capturing device are described above in detail, the division is not compulsory. In fact, according to the implementations of the present disclosure, the features and functions of the two or more modules or units described above may be embodied in one module or unit. Similarly, the feature and function of one module or unit described above may be further embodied in a plurality of modules or units. The parts displayed as modules or units may or may not be physical units, that is, may be located in one place or may be distributed on a plurality of network units. The objectives of the solutions of the present disclosure may be implemented by selecting some or all of the modules according to actual needs. A person of ordinary skill in the art may understand and implement the present disclosure without creative efforts.

In an exemplary embodiment of the present disclosure, a computer-readable storage medium is further provided, storing a computer program, the program including an executable instruction, the executable instruction, when executed by for example, a processor, implementing the steps of the method for determining a pose of an image capturing device in any one of the foregoing embodiments. In some possible implementations, the aspects of the present disclosure may also be implemented in the form of a program product, including program code. When the program product runs on a terminal device, the program code is configured to cause the terminal device to perform the steps described in the method for determining a pose of an image capturing device in the present specification according to various exemplary embodiments in the present disclosure.

According to the embodiments of the present disclosure, the program product configured to implement the foregoing method may use a compact disc read-only memory (CD-ROM), includes program code, and may be run on a terminal device such as a personal computer. However, the program product of the present disclosure is not limited to this. In the present specification, the readable storage medium may be any tangible medium including or storing a program, and the program may be used by or in combination with an instruction execution system, apparatus, or device.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable computer magnetic disk, a hard disk, a random access memory (RAM), a read-only memory (ROM), an erasable programmable read-only memory (EPROM) or flash memory, an optical fiber, a compact disc read-only memory (CD-ROM), an optical storage device, a magnetic storage device, or any appropriate combination thereof.

The computer-readable storage medium may include a data signal propagated in a baseband or as part of a carrier, in which computer-readable program code is carried. A data signal propagated in such a way may assume a plurality of forms, including, but not limited to, an electromagnetic signal, an optical signal, or any appropriate combination thereof. The readable storage medium may also be any readable medium other than the readable storage medium, which readable medium may send, propagate, or transmit a program configured to be used by or in combination with an instruction execution system, apparatus, or device. The program code embodied on the readable storage medium may be transmitted by using any suitable medium, including, but not limited to, wireless, wired, cable, radio frequency (RF), etc., or any appropriate combination thereof.

The program code configured to execute the operations of the present disclosure may be written by using any combination of one or more programming languages. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In cases involving a remote computing device, the remote computing device may be connected to a user computing device through any type of network including a local area network (LAN) or a wide area network (WAN), or may be connected to an external computing device (for example, through the Internet by using an Internet service provider).

In an exemplary embodiment of this disclosure, an electronic device is further provided. The electronic device may include a processor and a memory configured to store an executable instruction of the processor. The processor is configured to execute the executable instruction to perform the steps of the method for determining a pose of an image capturing device in any one of the foregoing embodiments.

A person skilled in the technical field may understand that the aspects of the present disclosure may be implemented as systems, methods, or program products. Therefore, the aspects of the present disclosure may be specifically embodied in the following forms: hardware only implementations, software only implementations (including firmware, micro code, etc.), or implementations with a combination of software and hardware, which are collectively referred to as "circuit", "module", or "system" herein.

An electronic device 1500 according to this implementation of the present disclosure is described below with reference to FIG. 15. The electronic device 1500 shown in FIG. 15 is only an example, and does not impose any limitation on the functions and the scope of use of the embodiments of the present disclosure.

Figure 15:
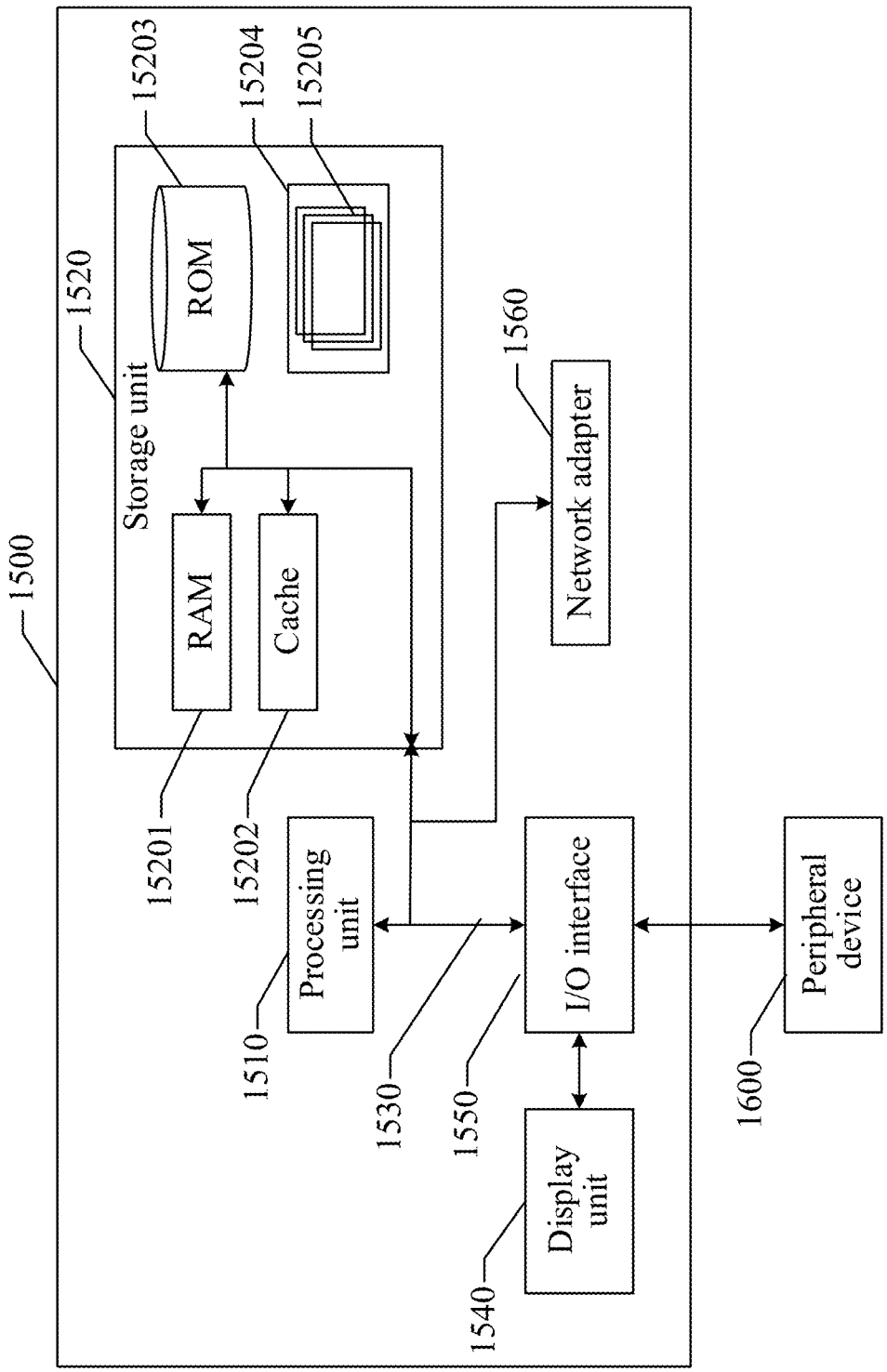
FIG. 15 is a schematic block diagram of an electronic device according to an embodiment of the present disclosure.

As shown in FIG. 15, the electronic device 1500 is embodied in the form of a general-purpose computing device. Components of the electronic device 1500 may include, but are not limited to, at least one processing unit 1510, at least one storage unit 1520, a bus 1530 connecting different system components (including the storage unit 1520 and the processing unit 1510), and a display unit 1540. It is to be understood that the display unit 1540 and a network adapter 1560 described below may not be necessary in different embodiments of this application. For example, in a case in that the method for determining a pose of an image capturing device described in the embodiments of this application is performed by the electronic device in the form of a server, the electronic device may not include the display unit 1540.

The storage unit stores program code. The program code is executable by the processing unit 1510, to cause the processing unit 1510 to perform the steps described in the method for determining a pose of an image capturing device in this specification according to various exemplary implementations in the present disclosure. For example, the processing unit 1510 may perform the steps shown in FIG. 1 to FIG. 7.

The storage unit 1520 may include a readable medium in the form of a volatile storage unit, for example, a random access memory (RAM) 15201 and/or a cache memory 15202, and may further include a read-only memory (ROM) 15203.

The storage unit 1520 may further include a program or utility 15204 having a set of (at least one) program modules 15205. Such a program module 15205 includes, but is not limited to, an operating system, one or more applications, other program modules and program data. Each or a combination of the examples may include an implementation of a network environment.

The bus 1530 may be one or more of several types of bus structures, including a storage unit bus or a storage unit controller, a peripheral bus, an accelerated graphics port, a processing unit, or a local bus using any one of the plurality of types of bus structures.

The electronic device 1500 may also communicate with one or more peripheral devices 1600 (for example, a keyboard, a pointing device, and a Bluetooth device), and may also communicate with one or more devices that enable a user to interact with the electronic device 1500, and/or communicate with any device (for example, a router and a modem) that enables the electronic device 1500 to communicate with one or more other computing devices. Such a communication may be implemented through an input/output (I/O) interface 1550. Moreover, the electronic device 1500 may also communicate with one or more networks (for example, a local area network (LAN), a wide area network (WAN) and/or a public network such as the Internet) through a network adapter 1560. The network adapter 1560 may communicate with other modules of the electronic device 1500 through the bus 1530. Although not shown in the figure, other hardware and/or software modules may be used in conjunction with the electronic device 1500. The other hardware and/or software modules include, but are not limited to, micro code, a device driver, a redundancy processing unit, an external magnetic disk driving array, a RAID system, a magnetic tape drive, a data backup storage system, and the like.

According to the foregoing descriptions of the implementations, a person skilled in the art may readily understand that the exemplary implementations described herein may be implemented by using software, or may be implemented by combining software and necessary hardware. Therefore, the technical solutions of the implementations of the present disclosure may be embodied in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a network device, or the like) to execute the method for determining a pose of an image capturing device according to the implementations of the present disclosure.

The present disclosure has been described by using the foregoing related embodiments. However, the foregoing embodiments are merely examples for implementing the present disclosure. The disclosed embodiments do not limit the scope of the present disclosure. Conversely, variations and improvements without departing from the spirit and scope of the present disclosure all belong to the protection scope of the patent of the present disclosure.

What is claimed is:

1. A method for determining a pose of an image capturing device performed at an electronic device having a processor and memory storing a plurality of programs to be executed by the processor, the method comprising:
acquiring a plurality of image frames captured by the image capturing device;
extracting a plurality of matching feature points from the plurality of image frames and determining first position information of each of the matching feature points in each of the plurality of image frames;
estimating second position information of each of the matching feature points in a current image frame in the plurality of image frames by using the first position information of each of the matching feature points extracted from a previous image frame in the plurality of image frames; and
determining a pose of the image capturing device based on the first position information and the second position information of each of the matching feature points in the current image frame.

2. The method according to claim 1, wherein the extracting a plurality of matching feature points in the plurality of image frames and determining first position information of each of the matching feature points in each of the plurality of image frames comprises:

acquiring two-dimensional position information of the first position information of each of the matching feature points in each image frame; and transforming the two-dimensional position information of the first position information into three-dimensional position information of the first position information by using an internal parameter matrix of the image capturing device, the three-dimensional position information of the first position information comprising depth information of a scene.

3. The method according to claim 2, wherein in a case that the current image frame is a first image frame in the plurality of image frames, the method further comprises:

before the estimating second position information of each of the matching feature points in a current image frame in the plurality of image frames by using the first position information of each of the matching feature points extracted from a previous image frame in the plurality of image frames:

initializing the three-dimensional position information of the first position information of each of the matching feature points in the current image frame; and determining an initial pose of the image capturing device through homography matrix transformation based on initialization information of the three-dimensional position information of the first position information.

4. The method according to claim 2, wherein the estimating second position information of each of the matching feature points in a current image frame in the plurality of image frames by using the first position information of each of the matching feature points extracted from a previous image frame in the plurality of image frames comprises:

converting two-dimensional position information of the first position information of each of the matching feature points in the previous image frame into two-dimensional position information of the second position information of each of the matching feature points in the current image frame based on the internal parameter matrix and a motion parameter matrix used in a process of acquiring the previous image frame to the current image frame by the image capturing device, the motion parameter matrix comprising a rotation matrix and a displacement vector of the image capturing device, the rotation matrix representing posture information in the pose of the image capturing device, and the displacement vector representing position information in the pose of the image capturing device.

5. The method according to claim 4, wherein the determining a pose of the image capturing device based on the first position information and the second position information of each of the matching feature points in the current image frame comprises:

calculating a difference between the two-dimensional position information of the first position information of each of the matching feature points in the current image frame and the two-dimensional position information of the second position information of each of the matching feature points in the current image frame;

estimating the motion parameter matrix and the three-dimensional position information of the first position information of each of the matching feature points in the current image frame by minimizing the difference; and updating a pose of the image capturing device during capturing of the current image frame based on the rotation matrix and the displacement vector in the estimated motion parameter matrix.

6. The method according to claim 5, wherein the two-dimensional position information of the second position information of each of the matching feature points in the current image frame is a projection of a two-dimensional position of the first position information of the matching feature point extracted from the previous image frame on the current image frame, and the estimating the motion parameter matrix and the three-dimensional position information of the first position information of each of the matching feature points in the current image frame by minimizing the difference comprises:

solving the motion parameter matrix and the three-dimensional position information of the first position information of the matching feature point in the current image frame in a case that a quadratic sum of a difference between the two-dimensional position information of the first position information of each of the matching feature points in the current image frame and the projection is minimized.

7. The method according to claim 5, wherein the determining a pose of the image capturing device based on the first position information and the second position information of each of the matching feature points in the current image frame further comprises:

determining the pose as a final pose of the image capturing device in a case that a pose of the image capturing device determined according to a current matching feature point is the same as a pose of the image capturing device determined according to a previous matching feature point.

8. An electronic device, comprising:

a processor; and a memory configured to store a plurality of executable instructions that, when executed by the processor, cause the electronic device to perform a plurality of operations including:

acquiring a plurality of image frames captured by an image capturing device;

extracting a plurality of matching feature points from the plurality of image frames and determining first position information of each of the matching feature points in each of the plurality of image frames;

estimating second position information of each of the matching feature points in a current image frame in the plurality of image frames by using the first position information of each of the matching feature points extracted from a previous image frame in the plurality of image frames; and determining a pose of the image capturing device based on the first position information and the second position information of each of the matching feature points in the current image frame.

9. The electronic device according to claim 8, wherein the extracting a plurality of matching feature points in the plurality of image frames and determining first position information of each of the matching feature points in each of the plurality of image frames comprises:

acquiring two-dimensional position information of the first position information of each of the matching feature points in each image frame; and transforming the two-dimensional position information of the first position information into three-dimensional position information of the first position information by using an internal parameter matrix of the image capturing device, the three-dimensional position information of the first position information comprising depth information of a scene.

10. The electronic device according to claim 9, wherein in a case that the current image frame is a first image frame in the plurality of image frames, the plurality of operations further comprise:

before the estimating second position information of each of the matching feature points in a current image frame in the plurality of image frames by using the first position information of each of the matching feature points extracted from a previous image frame in the plurality of image frames:

initializing the three-dimensional position information of the first position information of each of the matching feature points in the current image frame; and determining an initial pose of the image capturing device through homography matrix transformation based on initialization information of the three-dimensional position information of the first position information.

11. The electronic device according to claim 9, wherein the estimating second position information of each of the matching feature points in a current image frame in the plurality of image frames by using the first position information of each of the matching feature points extracted from a previous image frame in the plurality of image frames comprises:

converting two-dimensional position information of the first position information of each of the matching feature points in the previous image frame into two-dimensional position information of the second position information of each of the matching feature points in the current image frame based on the internal parameter matrix and a motion parameter matrix used in a process of acquiring the previous image frame to the current image frame by the image capturing device, the motion parameter matrix comprising a rotation matrix and a displacement vector of the image capturing device, the rotation matrix representing posture information in the pose of the image capturing device, and the displacement vector representing position information in the pose of the image capturing device.

12. The electronic device according to claim 11, wherein the determining a pose of the image capturing device based on the first position information and the second position information of each of the matching feature points in the current image frame comprises:

calculating a difference between the two-dimensional position information of the first position information of each of the matching feature points in the current image frame and the two-dimensional position information of the second position information of each of the matching feature points in the current image frame;

estimating the motion parameter matrix and the three-dimensional position information of the first position information of each of the matching feature points in the current image frame by minimizing the difference; and updating a pose of the image capturing device during capturing of the current image frame based on the rotation matrix and the displacement vector in the estimated motion parameter matrix.

13. The electronic device according to claim 12, wherein the two-dimensional position information of the second position information of each of the matching feature points in the current image frame is a projection of a two-dimensional position of the first position information of the matching feature point extracted from the previous image frame on the current image frame, and the estimating the motion parameter matrix and the three-dimensional position information of the first position information of each of the matching feature points in the current image frame by minimizing the difference comprises:

solving the motion parameter matrix and the three-dimensional position information of the first position information of the matching feature point in the current image frame in a case that a quadratic sum of a difference between the two-dimensional position information of the first position information of each of the matching feature points in the current image frame and the projection is minimized.

14. The electronic device according to claim 12, wherein the determining a pose of the image capturing device based on the first position information and the second position information of each of the matching feature points in the current image frame further comprises:

determining the pose as a final pose of the image capturing device in a case that a pose of the image capturing device determined according to a current matching feature point is the same as a pose of the image capturing device determined according to a previous matching feature point.

15. A non-transitory computer-readable storage medium storing at least one instruction, the instruction being loaded and executed by a processor of an electronic device and causing the electronic device to perform a plurality of operations including:

acquiring a plurality of image frames captured by an image capturing device;

extracting a plurality of matching feature points from the plurality of image frames and determining first position information of each of the matching feature points in each of the plurality of image frames;

estimating second position information of each of the matching feature points in a current image frame in the plurality of image frames by using the first position information of each of the matching feature points extracted from a previous image frame in the plurality of image frames; and determining a pose of the image capturing device based on the first position information and the second position information of each of the matching feature points in the current image frame.

16. The non-transitory computer-readable storage medium according to claim 15, wherein the extracting a plurality of matching feature points in the plurality of image frames and determining first position information of each of the matching feature points in each of the plurality of image frames comprises:

acquiring two-dimensional position information of the first position information of each of the matching feature points in each image frame; and transforming the two-dimensional position information of the first position information into three-dimensional position information of the first position information by using an internal parameter matrix of the image capturing device, the three-dimensional position information of the first position information comprising depth information of a scene.

17. The non-transitory computer-readable storage medium according to claim 16, wherein in a case that the current image frame is a first image frame in the plurality of image frames, the plurality of operations further comprise:
before the estimating second position information of each of the matching feature points in a current image frame in the plurality of image frames by using the first position information of each of the matching feature points extracted from a previous image frame in the plurality of image frames:
initializing the three-dimensional position information of the first position information of each of the matching feature points in the current image frame; and
determining an initial pose of the image capturing device through homography matrix transformation based on initialization information of the three-dimensional position information of the first position information.

18. The non-transitory computer-readable storage medium according to claim 16, wherein the estimating second position information of each of the matching feature points in a current image frame in the plurality of image frames by using the first position information of each of the matching feature points extracted from a previous image frame in the plurality of image frames comprises:
converting two-dimensional position information of the first position information of each of the matching feature points in the previous image frame into two-dimensional position information of the second position information of each of the matching feature points in the current image frame based on the internal parameter matrix and a motion parameter matrix used in a process of acquiring the previous image frame to the current image frame by the image capturing device,
the motion parameter matrix comprising a rotation matrix and a displacement vector of the image capturing device, the rotation matrix representing posture information in the pose of the image capturing device, and the displacement vector representing position information in the pose of the image capturing device.

19. The non-transitory computer-readable storage medium according to claim 18, wherein the determining a pose of the image capturing device based on the first position information and the second position information of each of the matching feature points in the current image frame comprises:
calculating a difference between the two-dimensional position information of the first position information of each of the matching feature points in the current image frame and the two-dimensional position information of the second position information of each of the matching feature points in the current image frame;
estimating the motion parameter matrix and the three-dimensional position information of the first position information of each of the matching feature points in the current image frame by minimizing the difference; and
updating a pose of the image capturing device during capturing of the current image frame based on the rotation matrix and the displacement vector in the estimated motion parameter matrix.

20. The non-transitory computer-readable storage medium according to claim 19, wherein the determining a pose of the image capturing device based on the first position information and the second position information of each of the matching feature points in the current image frame further comprises:
determining the pose as a final pose of the image capturing device in a case that a pose of the image capturing device determined according to a current matching feature point is the same as a pose of the image capturing device determined according to a previous matching feature point.

* * * * *